US010852026B2

(12) United States Patent
Gagnon

(10) Patent No.: US 10,852,026 B2
(45) Date of Patent: Dec. 1, 2020

(54) CONTROLLER, METHOD AND COMPUTER PROGRAM PRODUCT FOR CONTROLLING AN ENVIRONMENTAL CONDITION IN A BUILDING

(71) Applicant: Distech Controls Inc., Brossard (CA)

(72) Inventor: Dominic Gagnon, St-Bruno-de-Montarville (CA)

(73) Assignee: DISTECH CONTROLS INC., Brossard (CA)

( * ) Notice: Subject to any disclaimer, the term of this patent is extended or adjusted under 35 U.S.C. 154(b) by 0 days.

(21) Appl. No.: 15/906,709

(22) Filed: Feb. 27, 2018

(65) Prior Publication Data
US 2019/0264944 A1 Aug. 29, 2019

(51) Int. Cl.
*F24F 11/64* (2018.01)
*G05B 17/02* (2006.01)
*H05B 47/105* (2020.01)

(52) U.S. Cl.
CPC .............. *F24F 11/64* (2018.01); *G05B 17/02* (2013.01); *H05B 47/105* (2020.01)

(58) Field of Classification Search
CPC ....... F24F 11/64; G05B 17/02; G05B 13/042; G05B 13/048; H05B 37/0227; H03H 21/0012
(Continued)

(56) References Cited

U.S. PATENT DOCUMENTS 5,905,659 A * 5/1999 Rose ................. H03H 21/0012
375/232
6,264,111 B1 7/2001 Nicolson et al.
(Continued)

OTHER PUBLICATIONS

Costa, L.M. and Kariniotakis, G., 2007, Jul.. A stochastic dynamic programming model for optimal use of local energy resources in a market environment. In 2007 IEEE Lausanne Power Tech (pp. 449-454). IEEE. (Year: 2007).*
(Continued)

*Primary Examiner* — Rocio Del Mar Perez-Velez
*Assistant Examiner* — Alicia M. Choi
(74) *Attorney, Agent, or Firm* — RatnerPrestia

(57) ABSTRACT

The present environmental condition controller and method provide for controlling an environmental condition in an area of a building. For doing so, a communication interface receives an environmental condition target value ($x_{ref}$), and an environmental condition measured value (x). A processing unit calculates an environmental condition adjustment value ($y_n$) with a recursive function based on the environmental condition measured value (x), the environmental condition target value ($x_{ref}$) and an adaptive proportionality value (k). The processing unit also generates and transmits a command based on the environmental condition adjustment value ($y_n$). The processing unit further stores in a memory the environmental condition adjustment value ($y_n$) as a previously calculated environmental condition adjustment value ($y_{n-1}$). Specific steps of the method are executed recursively. The present method may further be performed by a computer program product.

17 Claims, 6 Drawing Sheets

(58) Field of Classification Search
USPC .......................................................... 700/276
See application file for complete search history.

(56) References Cited

U.S. PATENT DOCUMENTS

| | | | |
|---|---|---|---|
| 2004/0181300 A1 | 9/2004 | Clark, Jr. et al. | |
| 2010/0042726 A1* | 2/2010 | Luzon | G06Q 10/06 |
| | | | 709/226 |
| 2011/0022193 A1* | 1/2011 | Panaitescu | A41D 20/00 |
| | | | 700/29 |
| 2011/0106516 A1* | 5/2011 | Friedlander | G06Q 10/04 |
| | | | 703/13 |
| 2013/0151013 A1* | 6/2013 | Nikovski | F24F 11/30 |
| | | | 700/276 |
| 2013/0184887 A1* | 7/2013 | Ainsley | G05B 15/02 |
| | | | 700/291 |
| 2014/0027103 A1* | 1/2014 | Strelec | G05D 23/1951 |
| | | | 165/239 |
| 2017/0051933 A1* | 2/2017 | Verhoeven | G05B 15/02 |
| 2017/0290095 A1* | 10/2017 | Pereira | H05B 6/687 |
| 2017/0338802 A1* | 11/2017 | Zhao | H03H 17/0202 |
| 2018/0087790 A1 | 3/2018 | Perez | |
| 2018/0267515 A1 | 9/2018 | House et al. | |
| 2019/0212712 A1 | 7/2019 | Wenzel et al. | |
| 2020/0158363 A1* | 5/2020 | Kogo | F24F 11/65 |
| 2020/0166233 A1* | 5/2020 | Takagi | F25B 13/00 |

OTHER PUBLICATIONS

Non Final Office Action for U.S. Appl. No. 15/927,342, dated Sep. 20, 2019, 16 pages.
U.S. Appl. No. 15/927,342, filed Mar. 21, 2018, 49 pages.
Notice of Allowance for U.S. Appl. No. 15/927,342, dated Nov. 19, 2019, 5 pages.

* cited by examiner

CONTROLLER, METHOD AND COMPUTER PROGRAM PRODUCT FOR CONTROLLING AN ENVIRONMENTAL CONDITION IN A BUILDING

TECHNICAL FIELD

The present disclosure relates to the field of building automation, and more precisely environmental condition controlling in an area of a building. More specifically, the present disclosure presents a controller, a method and a computer program product for controlling an environmental condition in an area of a building.

BACKGROUND

Building automation systems are centralized, interlinked, networks of hardware and software, which monitor and control the environmental conditions in an area of a building or a whole building such as commercial, industrial, institutional facilities, etc. For example, a Heating, Ventilation and Air Conditioning (HVAC) control system is used for regulating environmental condition of a building such as temperature. Generally, a environmental condition, for example a temperature, is sought to be obtained. For that purpose, a control system may implement a Proportional-Integral-Derivative (PID) algorithm for further drawing a conclusion on an action to be taken, such as heating, cooling, ventilating etc. Such a control system is referred to as a PID controller.

Although efficient, the PID controller often requires a rather complex calibration to obtain the proper degree of efficiency. Furthermore, a poorly or inappropriately calibrated provides an average control and efficiency. Also, the derivative of the error amplifies higher frequency measurements, which sometimes distort an output of the control system, resulting in a poor environmental condition control. Moreover, the PID controller usually has a linear output, which is highly inappropriate for non-linear systems such as HVAC control systems.

Therefore, there is a need for a controller comprising an adaptive control, and for a method and computer program product for controlling environmental condition in an area of a building using the adaptive control.

SUMMARY

According to a first aspect, the present disclosure provides an environmental condition controller. The environmental condition controller controls one environmental condition of an area of a building. The environmental condition controller comprises a communication interface, a memory and a processing unit. The communication interface receives an environmental condition target value ($x_{ref}$), and an environmental condition measured value (x) for the area of the building. The memory stores the environmental condition target value ($x_{ref}$), and an adaptive proportionality value (k). The processing unit calculates an environmental condition adjustment value ($y_n$) using a recursive function comprising at least: the environmental condition target value ($x_{ref}$), the adaptive proportionality value (k) and the environmental condition measured value (x). The processing unit further generates and transmits a command based on the calculated environmental condition adjustment value ($y_n$) and stores the calculated environmental condition adjustment value ($y_n$) in the memory as a previously calculated environmental condition adjustment ($y_{n-1}$).

According to a second aspect, the present disclosure provides a method for controlling at least one environmental condition in an area of a building. The method comprises receiving an environmental condition target value ($x_{ref}$) for the environmental condition via a communication interface of an environmental condition controller. The method further comprises receiving an environmental condition measured value (x) for the area of the building via the communication interface. The method pursues with calculating by the processing unit an environmental condition adjustment value ($y_n$) with a recursive function based on: the environmental condition measured value (x), the environmental condition target value ($x_{ref}$) and an adaptive proportionality value (k). The method pursues with generating and transmitting by the processing unit a command based on the environmental condition adjustment value ($y_n$). The method further comprises storing in memory the environmental condition adjustment value ($y_n$) as a previously calculated environmental condition adjustment value ($y_{n-1}$).

In a particular aspect, the following steps are executed recursively: receiving the environmental condition measured value (x) for the area of the building via the communication interface; calculating by the processing unit the environmental condition adjustment value ($y_n$) with the recursive function; generating and transmitting by the processing unit the command based on the environmental condition adjustment value ($y_n$); and storing in memory the environmental condition adjustment value ($y_n$) as the previously calculated environmental condition adjustment value ($y_{n-1}$).

According to a third aspect, a computer program product comprising instructions deliverable via an electronically-readable media, such as storage media and communication links, which when executed by the processing unit of an environmental condition controller provide for controlling an environmental condition in an area of a building by implementing the aforementioned method.

BRIEF DESCRIPTION OF THE DRAWINGS

Embodiments of the disclosure will be described by way of example only with reference to the accompanying drawings, in which.

DETAILED DESCRIPTION

Figure 1:
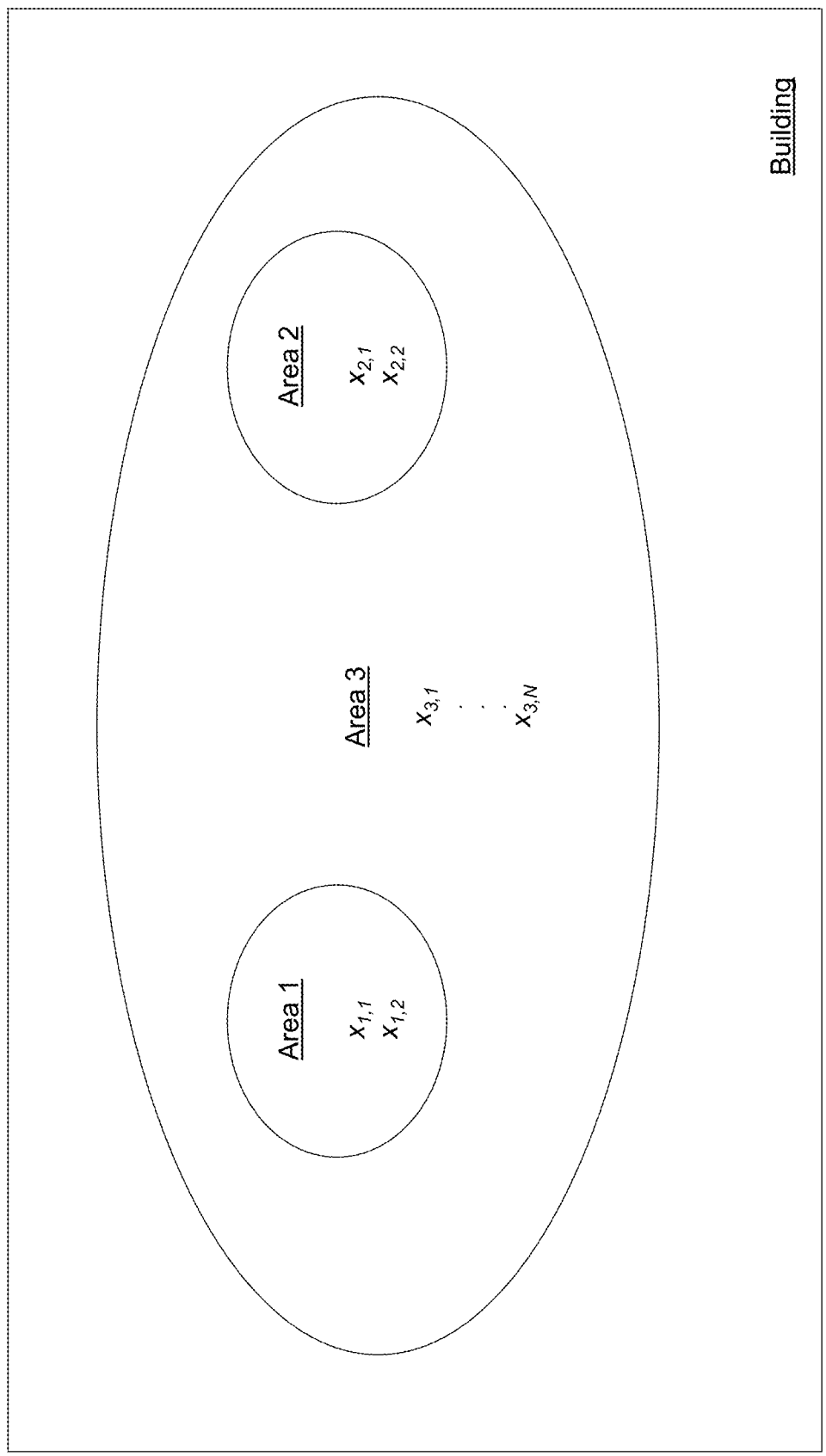
FIG. 1 is a schematic representing several areas of a building with corresponding environmental conditions.

The foregoing and other features will become more apparent upon reading of the following non-restrictive description of illustrative embodiments thereof, given by way of example only with reference to the accompanying drawings.

The following terminology is used throughout the present specification:

Environmental condition: State or influence in an area. The environmental condition comprises any of the following: temperature, pressure, humidity, lighting, CO2, flow, radiation, level, speed, sound; a variation of at least one of the following, temperature, pressure, humidity and lighting, CO2 levels, flows, radiations, water levels, speed, sound levels, etc., and/or a combination thereof.

Area of a building: The expression 'area of a building' is used throughout the present specification to refer to the interior of a whole building or a portion of the interior of the building such as, without limitation: a zone, a floor, a room, an aisle, etc.

Various aspects of the present disclosure generally address one or more of the problems related to environment control systems for buildings, and more particularly to environmental condition control in an area of a building.

Adaptive Control

The present disclosure relates to adaptive control. The adaptive control is based on recursive calculations to control an environmental condition in an area of a building, so as to efficiently recursively reach and smoothly maintain an environmental condition target value ($x_{ref}$). For doing so, the present adaptive control recursively calculates an environmental conditional adjustment value ($y_n$) upon receipt of an environmental condition measured value (x). The present adaptive control further iteratively calculates an adaptive proportionality value (k) when certain criteria are met. Recursively calculating the environmental conditional adjustment value ($y_n$) and iteratively re-calculating the adaptive proportionality value (k) flattens sudden fluctuations of the environmental condition, thereby ensuring a smoother control of the environmental condition in the area of the building, and reducing strain on the equipment (also called herein controlled equipment). As the environmental conditional adjustment value ($y_n$) is recursively calculated, the following nomenclature will be used throughout the present specification: ($y_n$) refers to a current calculation of the environmental conditional adjustment, ($y_{n-1}$) refers to a previously calculated environmental conditional adjustment value, and so on.

The environmental condition adjustment value ($y_n$) is calculated using one of the following equations:

$$y_n = k(f(n) + x - A \cdot x_{ref}) \qquad \text{(Equation 1)}$$

$$y_n = k(y_{n-1} + x - B \cdot x_{ref}) \qquad \text{(Equation 2)}$$

$$y_n = y_{n-1} + k(y_{n-1} + x - 2x_{ref}) \qquad \text{(Equation 3)}$$

wherein:
f(n) is a function comprising a previously calculated environmental condition adjustment value (e.g. $y_{n-1}$, $y_{n-2}$, $y_{n-3}$, etc.);
A is a real constant; and
B is a real constant.

The adaptive proportionality value (k) is re-calculated when at least one of the following conditions is met:
the environmental condition adjustment value ($y_n$) exceeds the environmental condition measured value (x); or
when a difference between the environmental condition measured value (x) and the environmental condition adjustment ($y_n$) is greater than a predefined tolerated variance.

The adaptive proportionality value (k) is re-calculated using the following equation:

$$k = e^{C \Delta t_c} - 1 \qquad \text{(Equation 4)}$$

where:
C is calculated using the equation $C = S/(y_{max} - y_{n-1})$;
S is the slope between two previous environmental condition adjustment values over time, and is calculated using the equation $S = dy/dt$;
$y_{max}$ is the environmental condition maximum output; and
$\Delta t_c$ is a time interval between each recursive calculation of equations (1), (2) and (3).

When the adaptive proportionality value (k) is calculated as previously described, the iterative re-calculation of its value is performed considerably less often than the rate of receipt of the environmental condition measured value (x). Additional condition(s) may be set on the calculation of the adaptive proportionality value (k) to take into consideration specific particularities of the controlled equipment being controlled, such as for example additional compensations at different phases of operation, such as for example doubling the calculated value of the adaptive proportionality value (k) when the controlled equipment is as start-up, tripling the value of the calculated adaptive proportionality value (k) at run-time (but not exceeding 1.5× its preceding value), etc.

Areas of a Building

Reference is now made to FIG. 1, which is a schematic representing several areas of a building with corresponding environmental conditions. A building may be divided into many areas, such as for example areas 1, 2 and 3. Each area may be independent of the other, such as shown by areas 1 and 2. Other areas may be related or dependent of other areas, such as area 3, which includes areas 1 and 2. Each area may have one or several environmental conditions, which can be measured and controlled.

Environmental Control System

Figure 2:
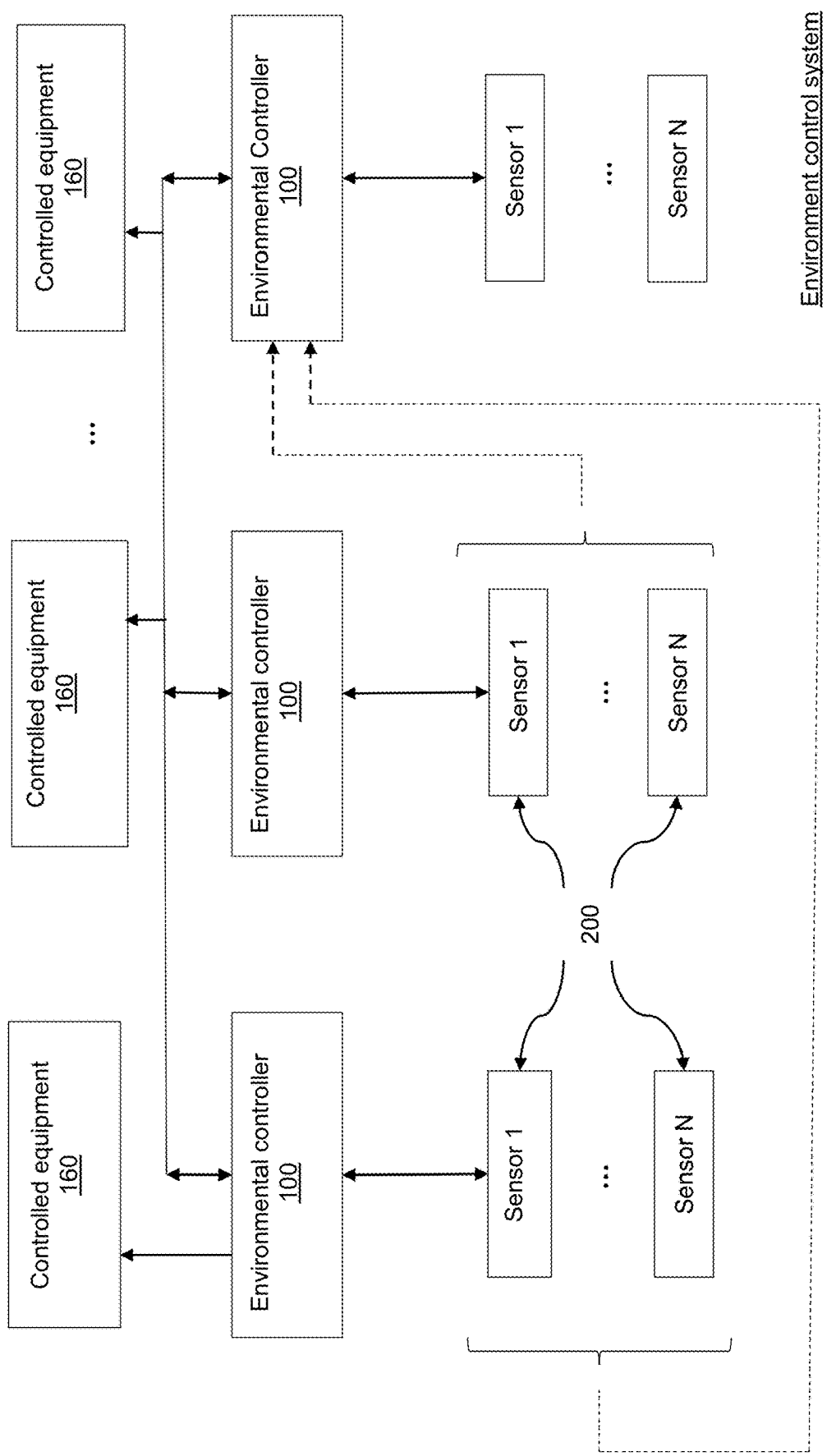
FIG. 2 is an exemplary functional diagram of interactions between components of an environmental control system.

An environment control system for controlling environmental condition of an area of a building is provided. Referring to FIG. 2, the environment control system controls one or several environmental conditions of one or several areas of the building. The environment control system comprises at least one environmental condition controller 100, at least one sensor 200 and at least one controlled equipment 160. Although three environmental condition controllers 100 and three controlled equipment 160 are shown on FIG. 2, the present system is not limited to such a configuration. For example, several controlled equipment 160 may communicate with a single environmental condition controller 100. Furthermore, several controlled equipment 160 may be used to control various environmental conditions in an area of a building, wherein some of the controlled equipment 160 communicate with one environmental condition controller 100 while other controlled equipment 160 communicate with a different environmental condition controller. The controlled equipment 160 is any type of equipment, which impacts at least one of the environmental conditions in at least one area of the building. For example, the controlled equipment 160 may be a heater, a ventilator, a humidifier, a dimmer, etc. The controlled equipment 160 thus performs at least one of the following: heating, cooling, ventilating, humidifying, dehumidifying, changing a lighting (e.g. turning on/off at least one light), opening or closing curtains, or a combination thereof.

When more than one sensor is used, the plurality of sensors 200 may be disposed in parallel, in series, or in a combination of parallel and serial configurations. For example, on FIG. 2, a plurality of sensors 202 are disposed in such a way that some sensors communicate only with a specific environmental condition controller 100, while other sensors may communicate with more than one environmental condition controllers 100. The disposition of the sensors 200 presented in FIG. 2 is for exemplary purposes only and are not intended to limit the scope of the present disclosure, as the number of sensors 200 and their disposition may vary and/or be different. Examples of sensors include, without limitations, a thermal sensor (such as a thermometer), a pressure sensor (such as a barometer), a hygrometer, a light sensor (such as a photo-sensor), or combination thereof etc. Those skilled in the art will understand that the functional diagram provided on FIG. 2 has been simplified for clarification purposes, and that many variants in the number and exchanges between the environmental condition controllers 100, the controlled equipment 160 and the sensors 200 may be performed.

Environmental Condition Controller

Figure 3:
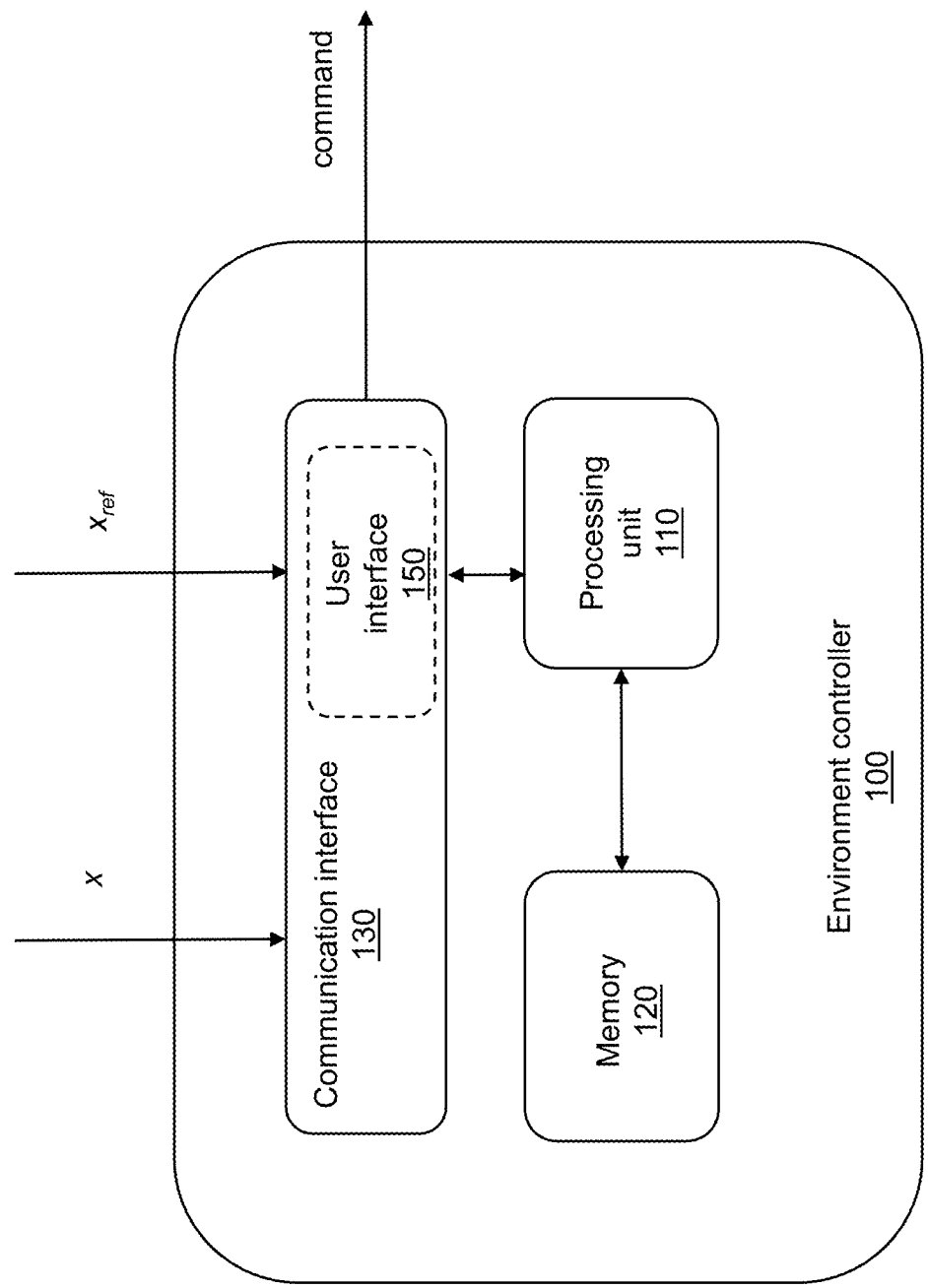
FIG. 3 is a functional diagram of an environmental condition controller.

Referring now concurrently to FIGS. 2 and 3, the environmental condition controller 100 comprises a processing unit 110, a memory 120, a communication interface 130 and a user interface 150. For clarity purposes, the following description describes the environmental condition controller 100 as receiving data, collecting data, performing calculations and sending instructions for one area of the building. However, those skilled in the art will understand that the environmental condition controller 100 may receive environmental conditions measured values, collect data, perform calculation generate and transmit commands for several areas of the building concurrently.

The processing unit 110 comprises one or more processors (not represented in FIG. 3) capable of executing instructions of a computer program. Each processor has one or several cores.

The memory 120 may comprise several memories, and use different types of memories, including volatile memory (such as a volatile Random-Access Memory (RAM)) and non-volatile memory (such as a hard drive or a flash memory).

The memory 120 stores instructions of computer program executed by the processing unit 110, received environmental conditions target values, and calculated values generated by the execution of the computer program.

The communication interface 130 supports any communication technology known in the art, such as for example: Wi-Fi, Wi-Fi mesh, Local Area Network (LAN), Universal Serial Bus (USB), taken solely or in combination. The communication interface 130 communicates, i.e. exchanges data, with the sensor 200 via wires and/or wirelessly. The communication interface 130 communicates with the sensor 200 using any known standard and communication protocol. Alternately, the communication interface 130 may only receive environmental condition measured values (x) at predetermined intervals from the sensors 200.

The communication interface 130 also exchanges data with one or several controlled equipment 160. The communication interface 130 communicates with the controlled equipment 160 in one direction or bi-directionally, directly or through a bus as shown on FIG. 3. The processing unit 110 sends commands through the communication interface 130 to the controlled equipment 160 and receives through the communication interface 130 confirmation and measurements performed by the controlled equipment 160.

The communication interface 130 also receives for each area of the building an environmental condition target value ($x_{ref}$). The environmental condition target value ($x_{ref}$) is received from any of the following: another environmental condition controller 100, a master building controller (not shown), or inputted by a technician configuring or performing maintenance, either locally or remotely. Furthermore, the communication interface 130 receives periodically the environmental condition measured value (x) for the area of the building from one or several sensors 200.

Alternatively, instead of receiving the environmental condition target value ($x_{ref}$) for each area of the building, the environmental condition target value ($x_{ref}$) may be locally or remotely calculated, based on a subset of known values comprising for example comfort levels, time of day, number of occupant in the area of the building, vocation of the area of the building, etc.

The communication interface 130 may further comprise a user interface 150 (e.g. a keyboard, a mouse, a touchscreen, etc.) for allowing a technician to locally input or adjust the environmental condition target value ($x_{ref}$) for the area of the building.

Figure 4:
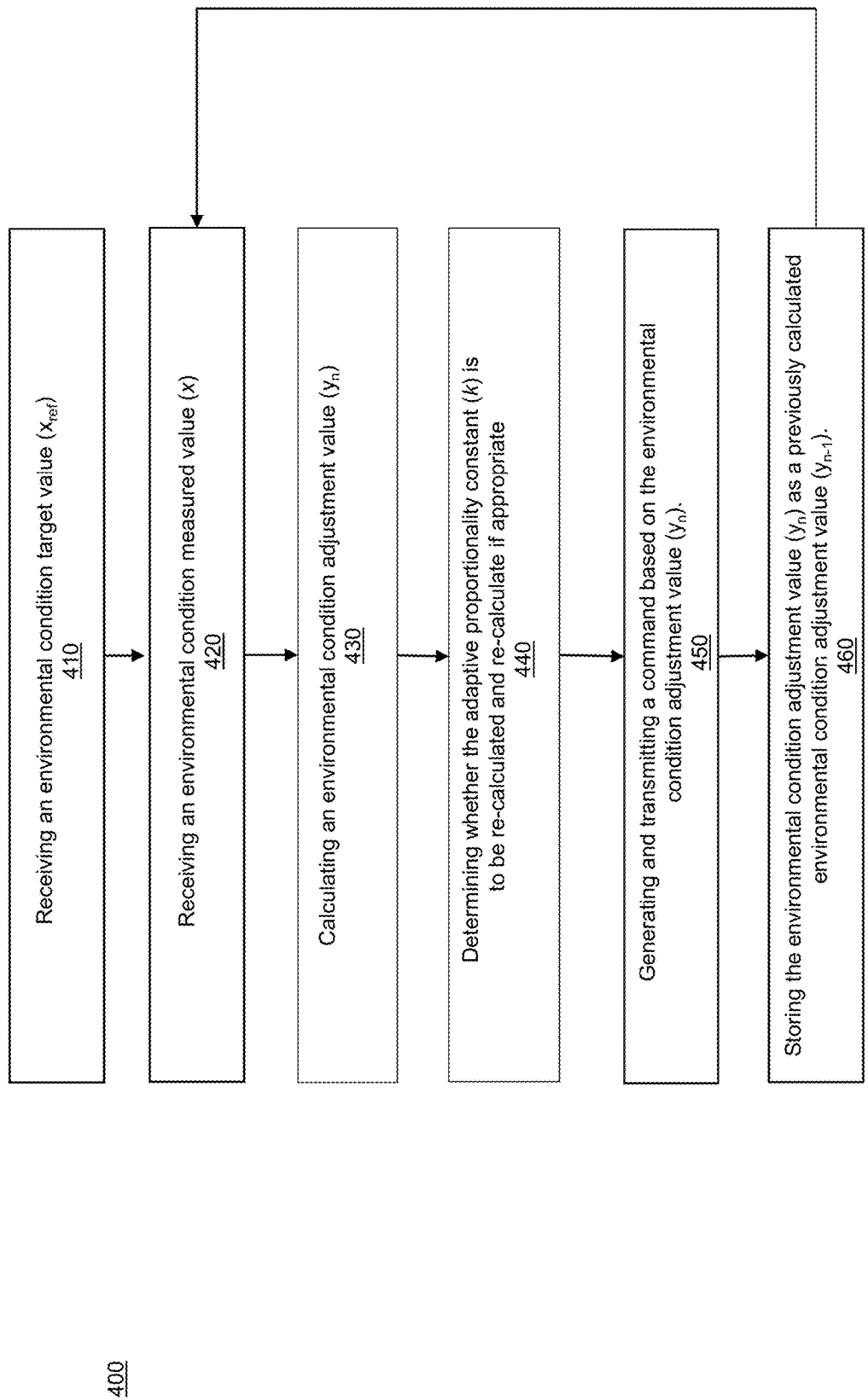
FIG. 4 represents a method for controlling an environmental condition in an area of a building.

Reference is now made concurrently to FIGS. 3 and 4, where FIG. 4 depicts an exemplary flowchart of a method of operation of the present environment controller 100. The processing unit 110 receives from the communication interface 130 the environmental condition target value ($x_{ref}$) in step 410. The processing unit 110 also periodically or intermittently receives through the communication interface 130 the environmental condition measured value (x) in step 420. As the environment controller 100 typically controls simultaneously several environmental conditions for several areas of the building, the processing unit typically receives through the communication interface 130 the environmental condition target values ($x_{ref}$) and the environmental condition measured values (x) for several environmental conditions in several areas of the building. The present description will be limited to one environmental condition in one area of the building for concision purposes only.

Upon receipt of the environmental condition measured value (x), the processing unit 110 calculates the environmental condition adjustment ($y_n$) using one of equations 1 to 3 previously presented in step 430.

When the environmental condition controller 100 is initiated, or when the controlled equipment 160 is newly installed or re-initiated, the processing unit 110 uses predetermined initial values for the adaptive proportionality value (k) and for the previously calculated environmental condition adjustment value ($y_{n-1}$). For example, the processing unit 110 may use predetermined initial values between 0 and 1, or randomly select values between 0 and 1.

After having calculated the environmental condition adjustment ($y_n$), the processing unit 110 determines whether the adaptive proportionality value (k) has to be re-calculated in step 440. The adaptive proportionality value (k) is re-calculated by the processing unit 110 when at least one of the following conditions is met:

the environmental condition adjustment ($y_n$) exceeds the environmental condition value (x); or when a difference between the environmental condition measured value (x) and the environmental condition adjustment ($y_n$) is greater than a predefined tolerated variance.

The processing unit 110 re-calculates the adaptive proportionality value (k) using equation (4) previously presented in step 440.

The processing unit 110 generates and transmits a command to the controlled equipment 160 via the communication interface 130, in step 450. The command includes instructions and the environmental condition adjustment value ($y_n$). Examples of commands include: heating, ventilating, cooling, humidifying, dehumidifying, changing lighting, adjusting sound, adjusting liquid level, reducing $CO_2$ level, etc.

The processing unit 110 then stores in memory 120 the environmental condition target value ($x_{ref}$) and the calculated environmental condition adjustment value ($y_n$) as a previously calculated environmental condition adjustment value ($y_{n-1}$) in step 460. Furthermore, the processing unit 110 may periodically store the environmental condition measured value (x). The processing unit 110 may also store in memory 120 the re-calculated adaptive proportionality value (k).

Furthermore, a specific computer program has instructions for implementing steps of the method 400. The instructions are comprised in a computer program product (stored in the memory 120). The instructions provide for controlling an environmental condition in an area of a building, when executed by the processing unit 110 of the environmental condition controller 100. The instructions are deliverable via an electronically-readable media, such as a storage media (e.g. USB key) or via communication links (e.g. Wi-Fi network or a Local Area network) through the communication interface 130 of the environmental condition controller 100.

Figure 5:
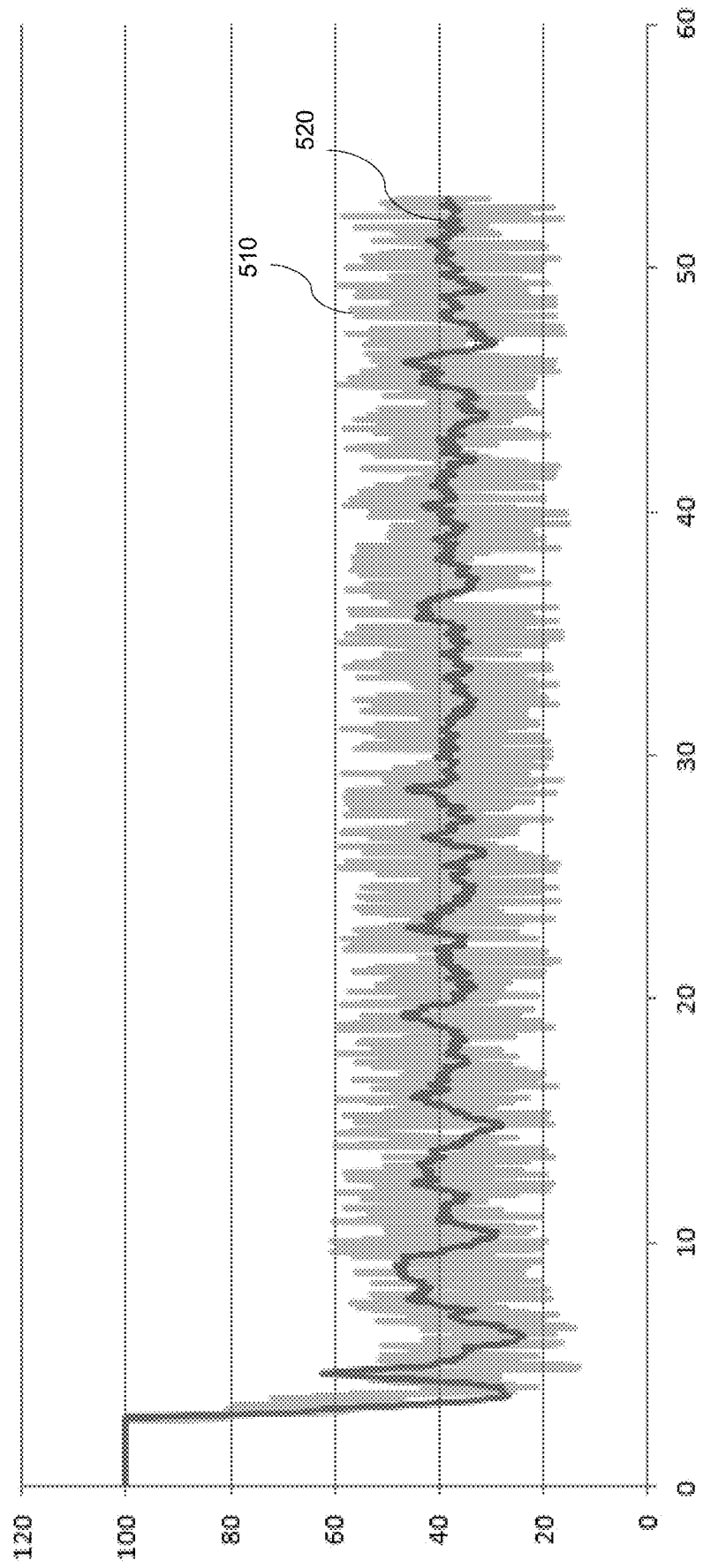
FIG. 5 is an exemplary graph showing the effect of the present adaptive control at reducing stress on controlled equipment.
Figure 6:
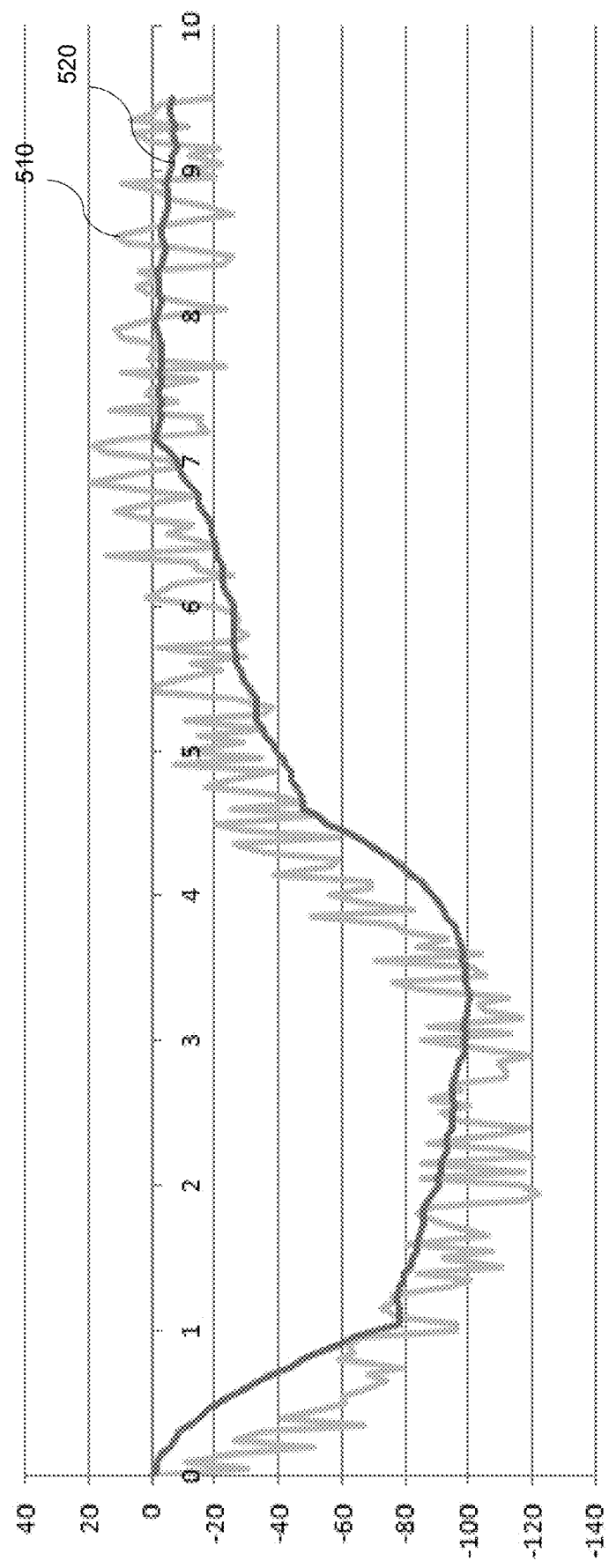
FIG. 6 is another exemplary graph showing the effect of the present adaptive control for reducing stress on controlled equipment.

Reference is now made to FIGS. 5 and 6, which are graphs comparing the effect of the present adaptive control on the command signals generated by the environment controller 100. In the graphs, reference 510 refers to the output signal of the environment controller 100 without the present adaptive control, while reference 520 refers to the output signal of the environment controller 100 with the present adaptive control. As can be appreciated, the present adaptive control reduces the fluctuations in output signal of the environment controller 100, thereby reducing the strain on the controlled equipment, while requiring minimal configuration and/or calibration from the environment controller 100.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. An environmental condition controller for controlling an environmental condition in an area of a building, the environmental condition controller comprising:
   a communication interface for:
      receiving an environmental condition target value ($x_{ref}$); and
      receiving an environmental condition measured value (x);
   a processing unit for:
      calculating an environmental condition adjustment value ($y_n$) using a recursive function comprising at least: the environmental condition target value ($x_{ref}$), an adaptive proportionality value (k), the environmental condition measured value (x) and a previously calculated environmental condition adjustment value ($y_m$) where m is lower than n;
      generating a command for controlling operations of a controlled equipment, the controlled equipment controlling the environmental condition in the area of the building, the command being based on the environmental condition adjustment value ($y_n$); and
      transmitting the command to the controlled equipment via the communication interface; and
   a memory for:
      storing the calculated environmental condition adjustment value ($y_n$) as a previously calculated environmental condition adjustment value;

wherein the recursive function is defined by:
$$y_n = y_{n-1} + k(y_{n-1} + x - 2x_{ref}),$$
or
$$y_n = k(y_{n-1} + x - B \cdot x_{ref})$$
where B is a real constant, or
$$y_n = k(f(n) + x - A \cdot x_{ref})$$
where A is a real constant and f(n) is a function comprising the previously calculated environmental condition adjustment value ($y_m$); and
   wherein the command is one of the following: a command for heating the area of the building by the controlled equipment, a command for ventilating the area of the building by the controlled equipment, a command for cooling the area of the building by the controlled equipment, a command for humidifying the area of the building by the controlled equipment, a command for dehumidifying the area of the building by the controlled equipment or a command for changing lighting of the area of the building by the controlled equipment.

2. The environmental condition controller of claim 1 wherein the environmental condition is one of the following: temperature, pressure, humidity or lighting.

3. The environmental condition controller of claim 1, wherein the processing unit further iteratively calculates the adaptive proportionality value (k) with the following equation:
$$k = e^{C \Delta t_c} - 1$$
where:
   C is calculated using the equation $C = S/(y_{max} - y_{n-1})$;
   S is the slope between two previous environmental condition adjustment values over time, and is calculated using the equation $S = dy/dt$;
   $y_{max}$ is the environmental condition maximum output; and
   $\Delta t_c$ is a time interval between each recursive calculation of the adaptive proportionality value (k).

4. The environmental condition controller of claim 3, wherein the processing unit iteratively calculates the adaptive proportionality value (k) when at least one of the following conditions is met:
   the environmental condition adjustment ($y_n$) exceeds the environmental condition value (x); or
   when a difference between the environmental condition value (x) and the environmental condition adjustment ($y_n$) is greater than a predefined tolerated variance.

5. A method for controlling an environmental condition in an area of a building, the method comprising:
   receiving an environmental condition target value ($x_{ref}$) via a communication interface of an environmental condition controller;
   receiving an environmental condition measured value (x) via the communication interface;
   calculating by a processing unit an environmental condition adjustment value ($y_n$) with a recursive function based on: the environmental condition measured value (x), the environmental condition target value ($x_{ref}$), an adaptive proportionality value (k) and a previously calculated environmental condition adjustment value ($y_m$) where m is lower than n;
   generating by the processing unit a command for controlling operations of a controlled equipment, the controlled equipment controlling the environmental condition in the area of the building, the command being based on the environmental condition adjustment value ($y_n$);

transmitting by the processing unit the command to the controlled equipment via the communication interface; and storing in a memory of the environmental condition controller the environmental condition adjustment value ($y_n$) as a previously calculated environmental condition adjustment value;

wherein the recursive function is defined by:

$$y_n = y_{n-1} + k(y_{n-1} + x - 2x_{ref}),$$

or $$y_n = k(y_{n-1} + x - B \cdot x_{ref})$$

where B is a real constant, or $$y_n = k(f(n) + x - A \cdot x_{ref})$$

where A is a real constant and f(n) is a function comprising the previously calculated environmental condition adjustment value ($y_m$); and wherein the command is one of the following: a command for heating the area of the building by the controlled equipment, a command for ventilating the area of the building by the controlled equipment, a command for cooling the area of the building by the controlled equipment, a command for humidifying the area of the building by the controlled equipment, a command for dehumidifying the area of the building by the controlled equipment or a command for changing lighting of the area of the building by the controlled equipment.

6. The method of claim 5, wherein the following steps are performed in a recursive loop:

receiving the environmental condition measured value (x) via the communication interface;

calculating by the processing unit the environmental condition adjustment value ($y_n$) with the recursive function;

generating and transmitting by the processing unit the command based on the environmental condition adjustment value ($y_n$), and storing in the memory of the environmental condition controller the environmental condition adjustment value ($y_n$) as a previously calculated environmental condition adjustment value.

7. The method of claim 5 wherein the environmental condition is one of the following: temperature, pressure, humidity and lighting.

8. The method of claim 5 wherein the processing unit further iteratively calculates the adaptive proportionality value (k) using the following equation:

$$k = e^{C \Delta t_c} - 1$$

where:

C is calculated using the equation $C = S/(y_{max} - y_{n-1})$;

S is the slope between two previous environmental condition adjustment values over time, and is calculated using the equation $S = dy/dt$;

$y_{max}$ is the environmental condition maximum output; and $\Delta t_c$ is a time interval between each recursive calculation.

9. The method of claim 8, wherein the adaptive proportionality value (k) is iteratively calculated by the processing unit when at least one of the following conditions is met:

the environmental condition adjustment ($y_n$) exceeds the environmental condition value (x); or when a difference between the environmental condition value (x) and the environmental condition adjustment ($y_n$) is greater than a predefined tolerated variance.

10. A computer program product comprising instructions deliverable via an electronically-readable media, such as storage media and communication links, which when executed by a processing unit of an environmental condition controller provide for controlling an environmental condition in an area of a building by:

receiving an environmental condition target value ($x_{ref}$) via a communication interface of an environmental condition controller;

receiving an environmental condition measured value (x) via the communication interface;

calculating by the processing unit an environmental condition adjustment value ($y_n$) with a recursive function based on: the environmental condition measured value (x), the environmental condition target value ($x_{ref}$), an adaptive proportionality value (k) and a previously calculated environmental condition adjustment value ($y_m$) where m is lower than n;

generating by the processing unit a command for controlling operations of a controlled equipment, the controlled equipment controlling the environmental condition in the area of the building, the command being based on the environmental condition adjustment value ($y_n$);

transmitting by the processing unit the command to the controlled equipment via the communication interface; and storing in a memory of the environmental condition controller the environmental condition adjustment value ($y_n$) as a previously calculated environmental condition adjustment value;

wherein the recursive function is defined by:

$$y_n = y_{n-1} + k(y_{n-1} + x - 2x_{ref}),$$

or $$y_n = k(y_{n-1} + x - B \cdot x_{ref})$$

where B is a real constant, or $$y_n = k(f(n) + x - A \cdot x_{ref})$$

where A is a real constant and f(n) is a function comprising the previously calculated environmental condition adjustment value ($y_m$); and wherein the command is one of the following: a command for heating the area of the building by the controlled equipment, a command for ventilating the area of the building by the controlled equipment, a command for cooling the area of the building by the controlled equipment, a command for humidifying the area of the building by the controlled equipment, a command for dehumidifying the area of the building by the controlled equipment or a command for changing lighting of the area of the building by the controlled equipment.

11. The computer program product of claim 10 wherein the processing unit further iteratively calculates the adaptive proportionality value (k) using the following equation:

$$k = e^{C \Delta t_c} - 1$$

where:

C is calculated using the equation $C = S/(y_{max} - y_{n-1})$;

S is the slope between two previous environmental condition adjustment values over time, and is calculated using the equation $S = dy/dt$;

$y_{max}$ is the environmental condition maximum output; and $\Delta t_c$ is a time interval between each recursive calculation.

12. The computer program product of claim 11, wherein the adaptive proportionality value (k) is iteratively calculated by the processing unit when at least one of the following conditions is met:
- the environmental condition adjustment ($y_n$) exceeds the environmental condition value (x); or
- when a difference between the environmental condition value (x) and the environmental condition adjustment ($y_n$) is greater than a predefined tolerated variance.

13. The computer program product of claim 10, wherein the environmental condition is one of the following: temperature, pressure, humidity and lighting.

14. The computer program product of claim 10, wherein the following steps are performed in a recursive loop:
- receiving the environmental condition measured value (x) via the communication interface;
- calculating by the processing unit the environmental condition adjustment value ($y_n$) with the recursive function;
- generating and transmitting by the processing unit the command based on the environmental condition adjustment value ($y_n$), and
- storing in the memory of the environmental condition controller the environmental condition adjustment value ($y_n$) as a previously calculated environmental condition adjustment value.

15. The environmental condition controller of claim 1 wherein, the environmental condition measured value (x) is measured by a sensor and transmitted by the sensor to the environmental condition controller.

16. The method of claim 5, wherein the environmental condition measured value (x) is measured by a sensor and transmitted by the sensor to the environmental condition controller.

17. The computer program product of claim 10, wherein the environmental condition measured value (x) is measured by a sensor and transmitted by the sensor to the environmental condition controller.

* * * * *